United States Patent
Huang et al.

[11] Patent Number: 6,064,540
[45] Date of Patent: May 16, 2000

[54] ACTIVE CONTROL FOR STABILIZING A SERVO-CONTROLLED ACTUATOR SYSTEM

[75] Inventors: Fu-Ying Huang; Wayne Isami Imaino; Francis C. Lee, all of San Jose, Calif.

[73] Assignee: International Business Machines Corporation, Armonk, N.Y.

[21] Appl. No.: 09/050,858

[22] Filed: Mar. 30, 1998

[51] Int. Cl.[7] .................................................. G11B 21/10
[52] U.S. Cl. .......................... 360/75; 360/77.03; 318/561; 318/610; 318/615
[58] Field of Search ........................... 360/75, 60, 77.02, 360/77.03, 77.05, 77.08, 78.04, 78.09, 78.11; 318/561, 610, 611, 615

[56] References Cited

U.S. PATENT DOCUMENTS

| | | | |
|---|---|---|---|
| 4,093,885 | 6/1978 | Brown | 360/77.16 X |
| 4,922,159 | 5/1990 | Phillips et al. | 318/128 |
| 5,426,545 | 6/1995 | Sidman et al. | 360/75 X |
| 5,459,383 | 10/1995 | Sidman et al. | 318/611 |

FOREIGN PATENT DOCUMENTS 594522  4/1994  European Pat. Off. .............. 360/75 H

OTHER PUBLICATIONS

Kobayashi, M. et al., MR–46 Carriage acceleration feedback multi-sensing controller for sector servo systems, Interntl. Conf. on Micromechanics for Info. and Precision Equip., Tokyo, pp. 475–480, Jul. 20–23, 1997.

*Primary Examiner*—Aristotelis M. Psitos
*Assistant Examiner*—James L Habermehl
*Attorney, Agent, or Firm*—Lumen Intellectual Property Services

[57] ABSTRACT

An active control mechanism and method for stabilizing a servo-controlled actuator system such as an actuator system in a data recording disk drive by compensating the vibrational modes of the actuator's arm assembly. The control mechanism has a sensing arrangement which can include one or more individual sensors attached to the actuator at locations where they generate signals in phase with the vibrational modes, and especially with all the major vibrational modes, of the arm assembly. A control mechanism derives from the signals an adjustment signal consisting of three corrective terms—a stiffening correction, an active damping correction and an inertia reduction correction—and the adjustment signal is used in the feedback control loop to stabilize the actuator system.

40 Claims, 9 Drawing Sheets

| | mode i | mode j | mode k | ... |
|---|---|---|---|---|
| sign of $\Delta_{\text{in-plane}}$ | + | - | + | ... |
| sign of $\varepsilon i$ for sensor location A | + | - | + | ... |
| sign of $\varepsilon i$ for sensor location B | - | + | + | ... |
| sign of $\varepsilon i$ for sensor location C | + | - | - | ... |

ACTIVE CONTROL FOR STABILIZING A SERVO-CONTROLLED ACTUATOR SYSTEM

FIELD OF THE INVENTION

This invention relates to an apparatus for and a method of active control for stabilizing multiple vibrational modes of an actuator system.

BACKGROUND OF THE INVENTION

Servo-controlled actuator systems experience serious problems due to mechanical actuator resonances. These vibrational modes include the natural modes of the actuator and those of any intervening mechanical components. With increasing mechanical complexity, the vibrational modes of any given actuator system become difficult to predict. The problem is further compounded as the operating frequency of the actuator system is increased. The vibrational modes limit the control loop gain of the servo system, reduce bandwidth of the servo system, or both. This causes the controlled element, such as a transducer head, to experience excessive settling time after positioning, poor response to disturbances, poor tracking ability, or any combination of these.

Prior art systems have attempted to ensure stable operation of actuator systems by stabilizing the control loop. This has been done by inserting gain stabilizing filters such as electronic notch filters in the control loop path. These filters are placed in the downstream portion of the control loop to filter out the signal information within the band reject frequency range of the notch and thus help minimize excitation of these actuator vibrational modes.

The technique utilizing notch filters allows the servo control system to effectively ignore lightly damped structural actuator resonances. At the resonances very little control is applied by the servo controller.

The drawback to this technique is that it depends on the ability of the designer to accurately predict the frequency of the vibrational modes. This becomes increasingly difficult in high accuracy regimes because the servo system is exposed to many unforeseen disturbances that excite unanticipated vibrational modes. For example, in a hard drive actuator such disturbances include servo amplifier saturation and distortion, external forces on the arm assembly, e.g., due to seek activity, air turbulence, stiction and the like. Such disturbances are typically generated at points in the control path where correction is impossible when gain stabilizing filters are present in the control loop. Consequently, although notch filters are useful in reducing predicted resonances of the servo control system, they do not inhibit the excitation of other vibrational modes by agents external to the servo control loop.

Another technique for damping vibrational modes of a servo control system was presented by Masahito Kobayashi et al. in "MR-46 *Carriage Acceleration Feedback Multi-Sensing Controller for Sector Servo Systems,*" at the International Conference on Micromechtronics for Information and Precision Equipment, Tokyo, Jul. 20–23, 1997. This proposed multi-sensing control system uses accelerometers to generate acceleration feedback. An acceleration feedback controller receives the feedback signals and compensates the servo to eliminate the mechanical resonance modes.

Although Kobayashi's technique has been demonstrated, it can not be efficiently implemented without the use of notch filters. Furthermore, designing the feedback controller requires the designer to model the very complicated transfer function $H_d(s)$ of the servo-controlled system. This is computationally challenging and requires a considerable amount of processing time. In addition, because the poles and zeros of the compensator used in the feedback controller can not be predetermined, it is not possible to guarantee the existence of a stable compensator.

The prior art also teaches gain stabilization through low-pass filtering in the control loop. In this approach the cutoff frequency of a low-pass filter that is inserted in the control loop is generally lower than the frequencies of any of the lightly damped resonances of the actuator structure. Thus, the components of the control signal having the resonance frequency are effectively prevented from exciting the vibrational modes of the actuator structure. This helps ensure system stability, but it also increases the phase shift at frequencies in the vicinity of the servo loop's unity gain crossing, thereby reducing the bandwidth of the servo system. In fact, this drawback applies to all gain stabilizing filters, including notch filters. The reduction in bandwidth, in turn, reduces the ability of the servo system to correct low frequency vibration and tracking performance such as run out and other disturbances that are due to external excitation and non-linearities in positioning operations.

In U.S. Pat. No. 5,459,383 Sidman et al. teach a feedback loop using a motion sensor located in the servo system at or near the point of control. The sensor is referred to as collocated because it is at or near the point of control. During operation the sensor detects both the rigid body motion and deformation of the actuator. The signal component from the rigid body motion is always much larger than that due to deformation. The collocated feedback loop operates in conjunction with the ordinary feedback loop and has the effect of making the servo system perform as if the mechanical structure of the system had a much higher mechanical damping than it actually possesses.

Although Sidman's system does improve positioning control and tolerance to internally and externally induced vibrational modes, it still relies on gain filters. Some negative effects of these filters are mitigated by the collocated feedback loop, but the most serious drawbacks, especially the requirement that the engineer know the vibrational modes ahead of time to ensure proper system design, are not obviated. Furthermore, the signal derived from the sensor includes the large rigid body component, which is also processed by the feedback loop and affects the rigid body motion properties of the actuator. This is undesirable since the rigid body properties of the actuator should be preserved.

Thus, the problem of stabilizing servo-controlled actuator systems remains. Solutions using filtering techniques are inadequate in high-accuracy regimes, e.g., in high density hard disk drives, since they require a priori knowledge of the vibrational modes of the system. Meanwhile, solving the transfer function to determine the vibrational modes is computationally unfeasible or impossible in most practical cases.

Finally, prior art systems suffer from the limitation of not being able to actively compensate for multiple vibrational modes at the same time. Specifically, if more than one single mode is selected for active control system stability is at risk.

OBJECTS AND ADVANTAGES OF THE INVENTION

Accordingly, it is a primary object of the present invention to provide an active control mechanism for stabilizing a servo-controlled actuator system and overcome the disadvantages of the prior art. Specifically, the control mechanism of the invention is designed to circumvent the limitations of the gain filtering approach and provide effective feedback over the actuator's entire range of operation by actively compensating for multiple vibrational modes, thus permitting higher bandwidth operation.

It is another object of the invention to design the control mechanism in such a way that no a priori knowledge of the system's vibrational modes is required for the digital servo controller.

Still another object of the invention is to increase the bandwidth of stable operation of the servo-controlled system and to thus permit one to design, e.g., in the field of hard disk drives, devices with a higher number of tracks per inch (TPI).

Yet another object of the invention is to provide a method for operating the system of the invention to produce an efficient feedback signal. The method limits the computational effort and ensures that the system compensates vibrations quickly and reliably.

Finally, it is an object of the invention to circumvent the necessity of directly solving the transfer function.

The above objects and advantages, as well as numerous improvements attained by the system and method of the invention are pointed out below.

SUMMARY OF THE INVENTION

These objects and advantages are attained by an active control mechanism for stabilizing a servo-controlled actuator system having an arm assembly, a controlled element mounted on the arm assembly, an actuator for moving the controlled element by moving the arm assembly and a position sensor, e.g., the controlled element itself, for generating a position signal indicating a displacement of the controlled element. The arm assembly experiences vibrational modes during operation which are compensated by the active control mechanism.

The control mechanism has a sensing arrangement which can include one or more individual sensors attached to the actuator for generating signals correlated to and in phase with the vibrational modes, and in particular with all the major vibrational modes. A control mechanism is connected to the sensors to derive from their signals an adjustment signal having three corrective terms: a stiffening correction, an active damping correction and an inertia reduction correction. A combining element connected to the control circuit, to the position sensor and to the actuator combines the adjustment signal and the position signal to produce a feedback signal. This feedback signal is used to drive the actuator via a current source which is connected to the combining element and actuator. Typically, the current source simply delivers a current proportional to the feedback signal to the actuator.

In the preferred embodiment the actuator is a coil, e.g., a VCM coil, and the sensors detect the in-plane sway deformations of the coil produced by the major vibrational modes. Suitable types of sensors for use in the system include strain sensors, strain rate sensors and strain acceleration sensors. The preferred sensor type is a strain rate sensor. In this case the control mechanism has an integrator for generating the stiffening correction, a linear element for generating the active damping correction and a differentiator for generating the inertia reduction correction.

The arm assembly typically has a coil support where the coil is mounted and the sway deformations of the coil produce deformations of the coil support which are registered by the sensors. In fact, for best results the sensors are mounted on the coil support. There are also other locations which meet the criteria that the sensor signal is in phase with all major modes with respect to the net in-plane sway deformation of the coil.

In some applications, such as hard disk drives, the preferred type of actuator is a rotary actuator. In this case, of course, the controlled element is a read/write head. Other applications require actuators executing other than rotary adjustments, e.g., linear displacements, and employ other types of controlled elements.

Depending on the implementation, the control mechanism may require a low-pass filter for cleaning the signals received from the sensors from unwanted high-frequency noise components. In addition, an interrupt circuit or device can be connected to the control mechanism to halt its operation while the arm assembly is accelerating during seeking.

The method of the invention actively stabilizes the actuator assembly by relying on the signals which are correlated to and approximately in phase with the vibrational modes. In practice, the vibrational modes consist of major modes and minor modes and the sensors have to generate signals correlated to and approximately in phase with the major modes. This is ensured by the proper placement of sensors. The placement can be ascertained by an empirical or computational method.

In the empirical method the sensors are removably affixed to the actuator, or the coil support, at a test position. Next, the test position is adjusted until a final position or placement is reached at which the signals delivered by the sensors are in phase with the major vibrational modes. The sensors are then permanently attached at the final position. The computational method involves analyzing the vibrational modes of the actuator and determining the final position based on this analysis.

The three correction terms are derived from the signals by differentiating, multiplying and integrating the signals. The operations required to derive each correction depend on whether the sensors used measure strain S, strain rate S', or strain acceleration S". In the preferred embodiment the sensors measure the rate of strain S' and the stiffening correction is derived by integrating the strain rate signals, the active damping correction is derived by multiplying the signals by a constant, and the inertia reduction correction is obtained by differentiating the signals.

The particulars of the invention are explained in the description portion in reference to the appended drawing figures.

DETAILED DESCRIPTION

Figure 1:
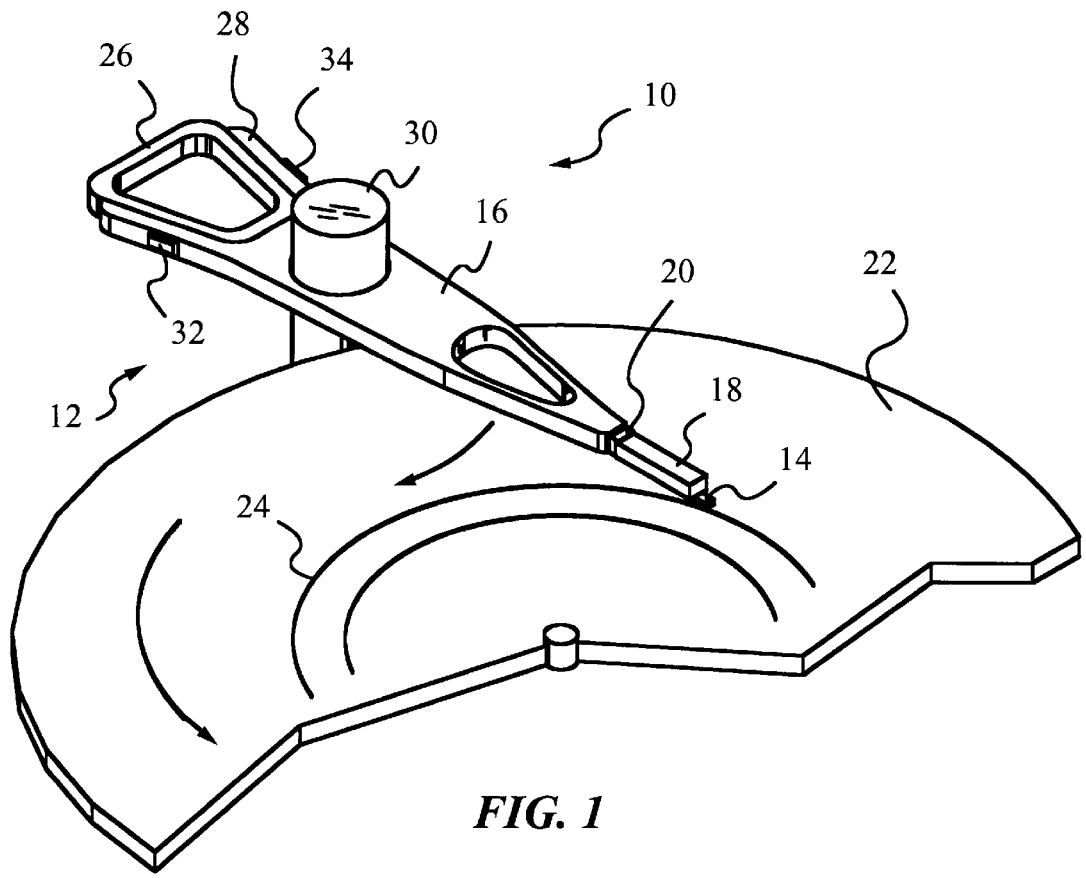
FIG. 1 is an isometric view of an actuator system with an arm assembly according to the invention.

FIG. 1 illustrates a preferred embodiment of a servo-controlled actuator system 10 for a hard disk drive. Actuator system 10 has an arm assembly 12 equipped with a controlled element 14, in this case a read/write head. Arm assembly 12 has a main arm 16 and a secondary arm 18 joined with main arm 16 by a joint 20. Entire assembly 12 is mounted on a hub 30. Head 14 is positioned above a disk 22 with concentric data tracks 24 and accesses various tracks 24 during operation by pivoting or rotating around hub 30. This general construction of arm assembly 12 is well-known in the art of hard disk drives.

An actuator 26, in this instance a coil, e.g. a VCM coil, is mounted in a cradle or coil support 28 opposite head 14. Actuator 26 moves arm assembly 12 by causing it to rotate about hub 30. Consequently, actuator 26 is also known as a rotary actuator. The amount of rotation is controlled by a feedback signal 50 (see FIG. 3) in the form of a current passed through coil 26. Feedback signal 50 is derived according to the method of the invention as explained below.

Figure 2:
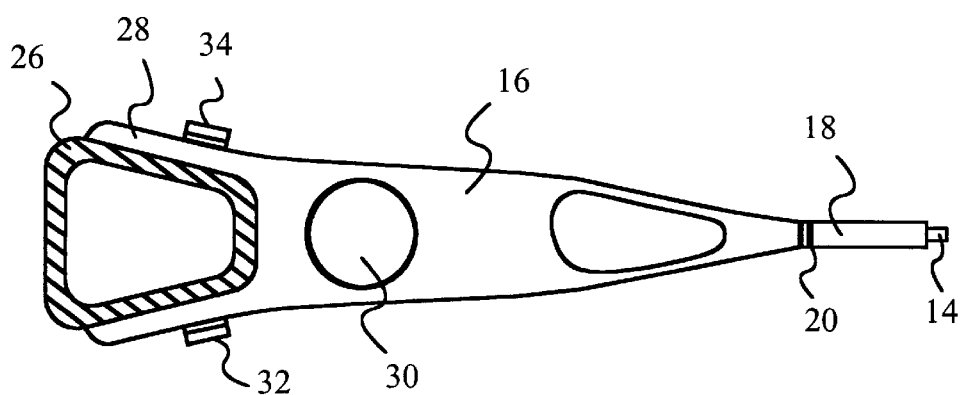
FIG. 2 is a top plan view of the arm assembly of the system of FIG. 1.

As better illustrated in the top plan view of FIG. 2, two sensors 32 and 34 are attached to arm assembly 12 on cradle 28 along two sides of coil 26. In this position, sensors 32, 34 are sensitive to the in-plane sway deformations experienced by coil 26. In other words, when arm assembly 12 experiences vibrational modes during operation, sensors 32, 34 generate signals correlated to these modes. This is because the in-plane sway deformations of coil 26 translate into deformations of cradle 28.

Figure 9:
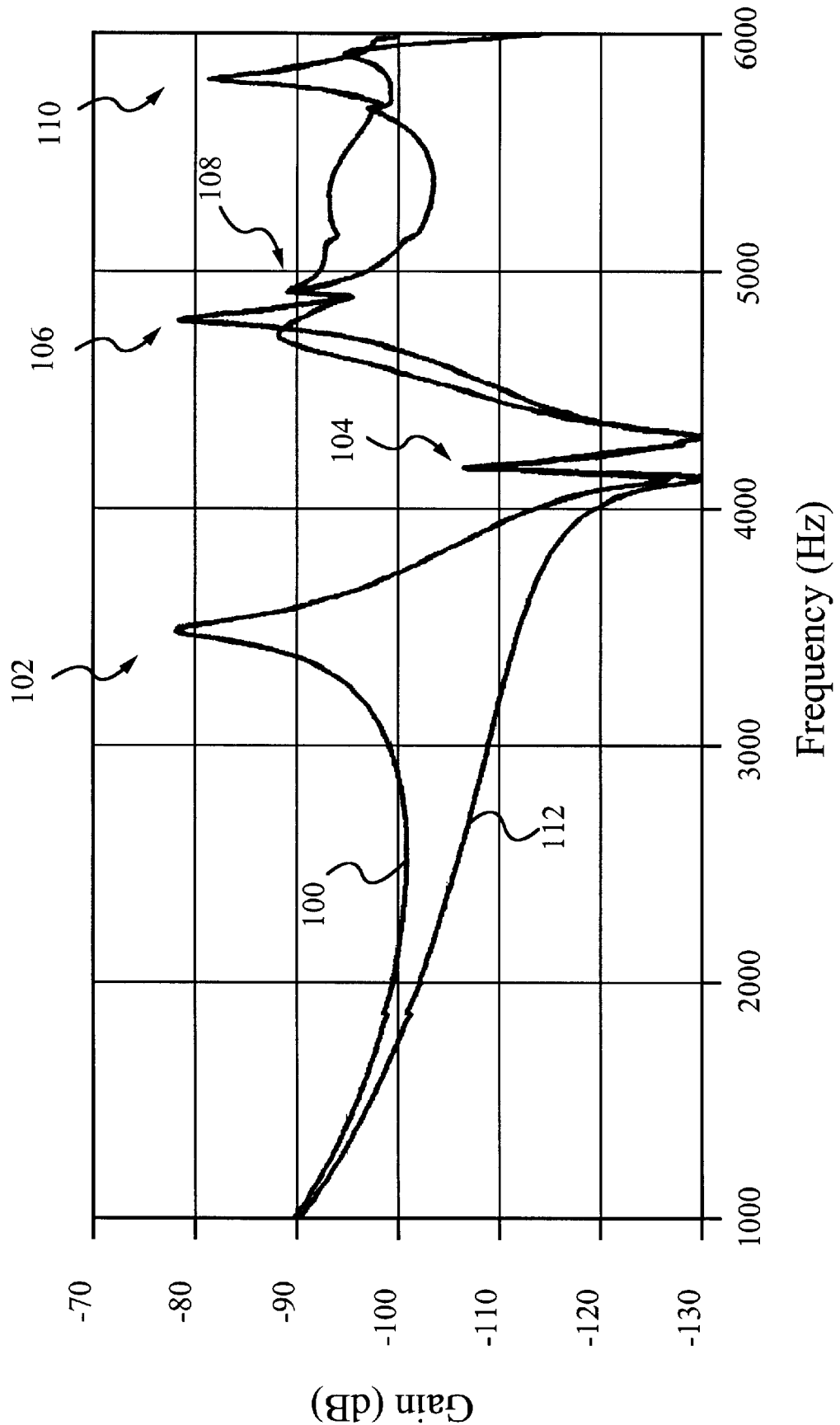
FIG. 9 is a graph of the transfer function of one arm assembly belonging to an IBM Sailfin actuator with and without active compensation.

In most instances an empirical approach is used to obtain a transfer function, H(s), describing the vibrational modes of an arm assembly. For purposes of illustration, the graph of FIG. 9 shows the transfer function for a particular IBM actuator called Sailfin. This actuator arrangement has ten separate arm assemblies. The most prominent vibrational modes are the "butterfly mode" centered at about 3,500 Hz, the S mode located at about 4,200 Hz, the end-arm mode at about 4,800 Hz and the second butterfly mode at about 5,800 Hz. The gain of the "butterfly mode" is chiefly responsible for the limited operation bandwidth of a typical arm assembly.

To properly compensate these modes, as well as any other modes of arm assembly 12 requiring active compensation, sensors 32, 34 are positioned such that their signals are correlated to the modes of arm assembly 12. As is true of any mechanical system, when arm assembly 12 vibrates, the vibration can be decomposed into several vibrational modes which have their own unique vibration shapes called "mode shapes". The mode shape $\overline{\phi}_i$ of the i-th mode can be expressed as:

$$\overline{\phi}_i = \overline{\phi}_i(x,y,z),$$

which is a function of location (x,y,z). The net in-plane sway deformation $\Delta_{in\text{-}plane}$ of coil 26 is then described by:

$$\Delta_{in\text{-}plane} = \int_{coil} \overline{\varphi}_i(x,y,z) \cdot \overline{F}(x,y,z) dx\, dy\, dz,$$

where $\overline{F}$ is the force applied on coil 26. Thus, the strain, $\epsilon_i$, experienced by sensor 32 due to the i-th vibrational mode is also a function of the mode shape $\overline{\phi}_i$ and is represented by:

$$\epsilon_i = \epsilon_i(\overline{\phi}_i).$$

When the sign of the sway deformation $\Delta_{in\text{-}plane}$ is the same as the sign of strain $\epsilon_i$ at the location of sensor 32, then the signal generated by sensor 32 is in phase with the i-th vibrational mode. Sensor 32 is placed at a location where such in-phase correlation exists between its signal and the i-th vibrational mode. Since two sensors 32, 34 are used in this particular embodiment, $\epsilon_i$ is replaced by the sum of the strains multiplied by weighting factors on both sensor locations.

Figures 4, 5:
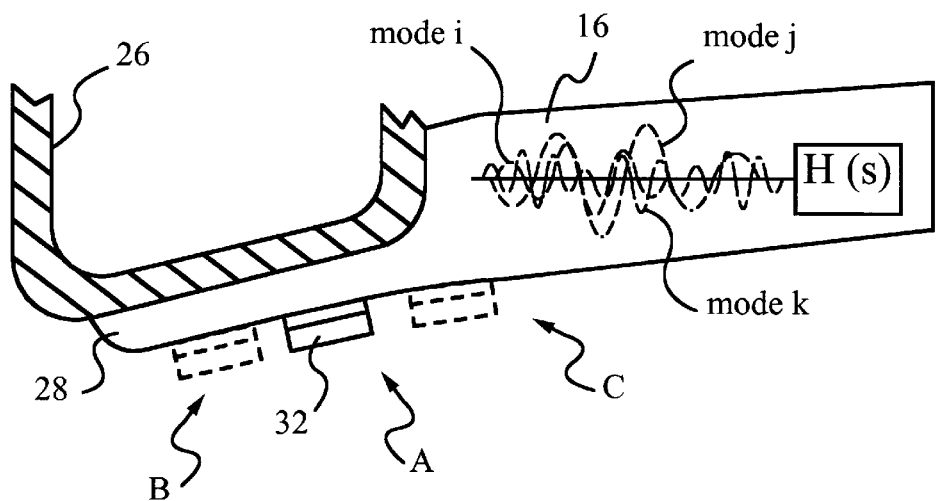
FIG. 4 is a schematic view illustrating the positioning of the sensors on a coil support.
FIG. 5 is a table illustrating the in-plane relationship between the strain sensor output and the major vibrational modes with respect to the net in-plane sway deformation.

Proper placement of sensors 32, 34 is visualized in more detail by FIGS. 4 and 5. For the sake of simplicity, FIG. 4 only shows three test positions A, B, and C of sensor 32. The transfer function H(s) consists of a multiplicity of modes of which three are major and have to be actively compensated: mode i, mode j and mode k. These may correspond to the first butterfly mode and the first and second end arm modes and directly limit servo performance and bandwidth because of their high gains and/or light damping. The remaining modes are minor modes, which have low gain and are heavily damped and negligible modes, which have very low gain and frequently lie outside the range of interest.

In each position, sensor 32 effectively partitions all vibrational modes into two groups; one group of modes is in phase with the signal of sensor 32 and the other is out of phase. The final position of sensor 32 has to be such that all major modes i, j and k are in phase with its signal. The phase relationship with minor and negligible modes is not important and these may all fall into the out of phase partition. In fact, minor modes generally remain stable due to original material damping.

The table in FIG. 5 shows the phase relationship between output signal of sensor 32 and major modes i, j, and k with respect to sway deformation $\Delta_{in\text{-}plane}$. At location A the signal of sensor 32 is in phase with modes i, j, and k. At location B the signal of sensor 32 is out of phase with modes i and j, and at location C it is out of phase with mode k. Hence, the proper final location for permanently mounting sensor 32 is A.

In practice, the proper final positions for sensors 32 and 34 can be found by empirical or analytic methods such as computer-implemented algorithms. When the mechanical structure of arm assembly 12 is specially designed, e.g., when arm assembly 12 belongs to a rotary actuator system used in hard disk drives, the general vicinity of the potential final position is easier to predict and hence the empirical approach is viable. For example, in the IBM Sailfin actuator the right side of the second to bottom arm is the proper general area to search for the final sensor position.

The analytical approach involves modeling arm assembly 12. This is done, for example, with the aid of finite element analysis software. The analysis pinpoints final position A on arm assembly 12, specifically on cradle 28, where sensor signals are in phase with the major modes. These positions are the set of final positions at which sensors 32 and 34 are permanently attached.

Figure 3:
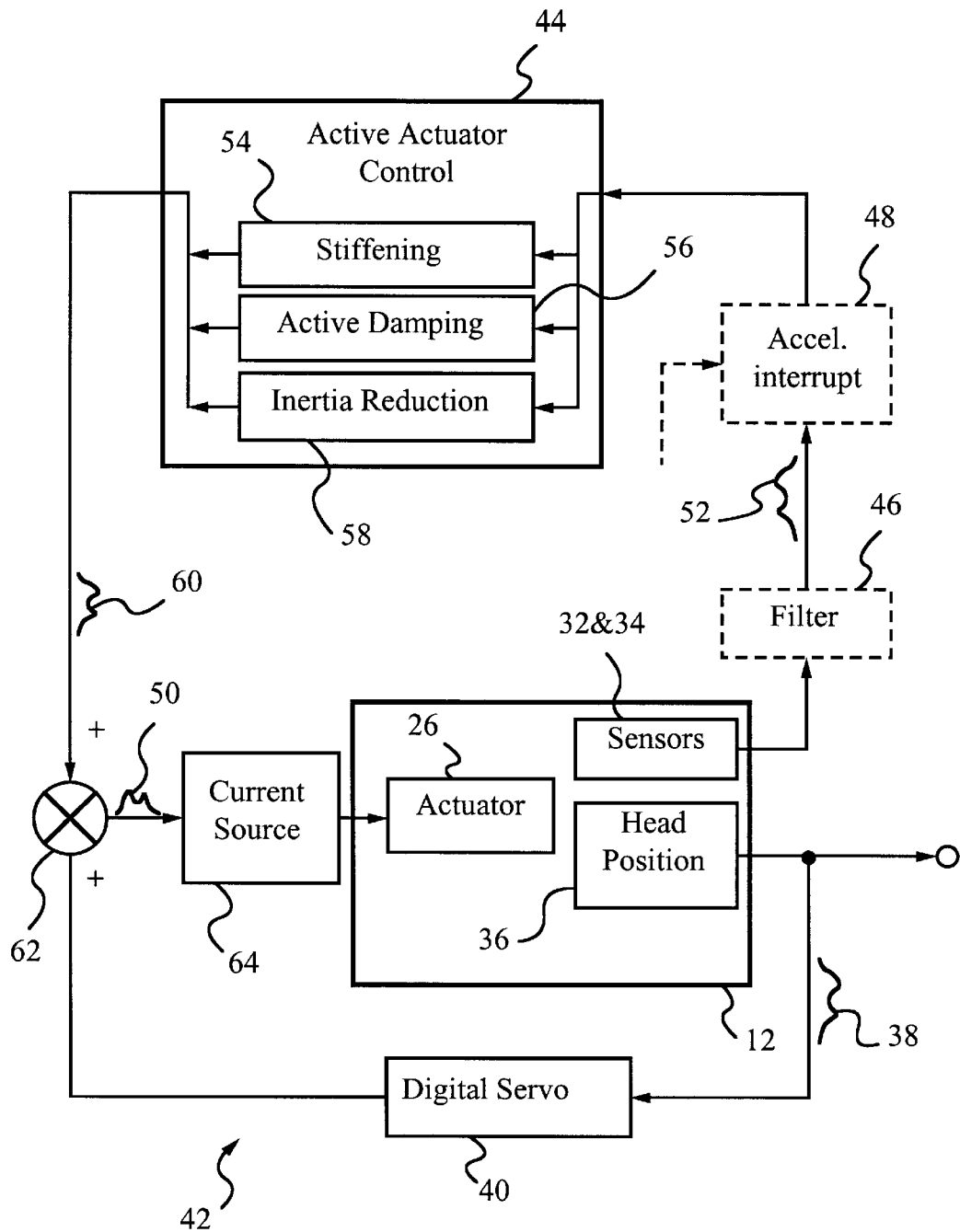
FIG. 3 is a block diagram of the active control system according to the invention.

The block diagram of FIG. 3 shows the vital parts of system 10 and explains their cooperation. In addition to the above-described elements, system 10 also has a position sensor 36, which can be a standard device, mounted either on or off arm assembly 12 for generating a position signal 38 indicating the displacement or the instantaneous position of head 14. In fact, position sensor 36 can simply be head 14 itself and position signal 38 can be derived by head 14 from markings disposed on disk 22 and specifically from position information found in tracks 24. Alternatively, head 14 can use the head position error signal (PES) read from prerecorded servo information on disk 22, e.g., servo sectors angularly spaced around disk 22, to generate position signal 38.

Position sensor 36 or head 14 is connected to a digital servo 40. Digital servo 40 is a part of a feedback loop 42 for controlling the operation of actuator 26 based on the position of head 14.

Sensors 32, 34 are connected to an active actuator control 44 via an optional filter 46, typically a low-pass filter, and an optional acceleration interrupt circuit 48, both indicated in dashed lines. In the preferred embodiment filter 46 is present and removes high-frequency noise components from signals 52 generated by sensors 32, 34. Interrupt circuit 48 is also present in the preferred embodiment and disables actuator control 44 while arm assembly 12 is accelerating. This happens, for example, while head 14 is rotated to switch data tracks 24 on disk 22.

Actuator control 44 has a stiffening part 54, an active damping part 56 and an inertia reduction part 58. These parts derive from signals 52 a stiffening correction, an active damping correction and an inertia reduction correction. Combined, these three correction terms represent an adjustment signal 60, which is sent to a combiner or adder 62. In fact, adder 62 is connected not only to actuator control 44 but also to digital servo 40. Thus, adder 62 adds position signal 38 as delivered by servo 40 to adjustment signal 60 to produce feedback signal 50. Preferably, feedback signal 50 is a current and adder 62 is connected directly to a current source 64 which controls the current in coil 26, thus completing feedback loop 42. Of course, amplifiers and filters may be required to process feedback signal 50. The use of these elements in feedback loop 42 is straightforward and their necessity and preferred locations can be easily determined by a person of average skill in the art.

Figure 6:
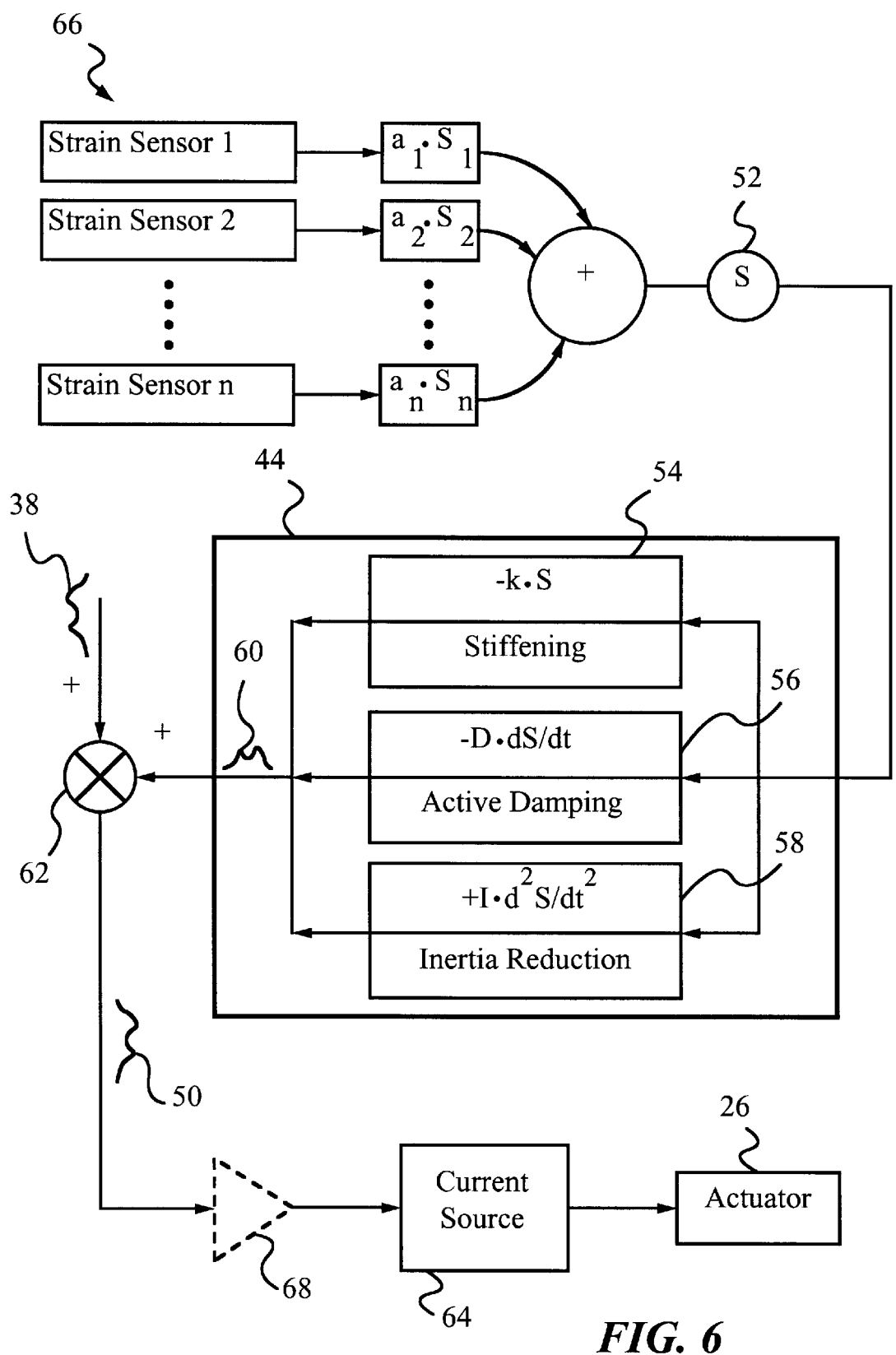
FIG. 6 is a block diagram showing the computation of the adjustment signal when using a strain sensor.

The details of how the three correction terms are computed are explained in reference to the generalized diagram of FIG. 6. The computation applies to sensors 32, 34 as well as any number of sensors n. Hence, the diagram shows sensors 32 and 34 replaced by a number n of sensors 66, each delivering a partial signal $a_i S_i$ such that the total signal 52 or S is:

$$S = \sum_{i=1}^{n} a_i S_i$$

where the $a_i$'s are constants or weighting factors. In this embodiment sensors 66 are strain sensors and consequently partial signals $S_i$ are in effect strain signals $\epsilon_i$ weighted by weighting factors $a_i$.

Total strain signal S is delivered to stiffening part 54, active damping part 56 and inertia reduction part 58 alike. Stiffening part 54 is a multiplier or linear element which multiplies strain signal S by a negative constant −k to produce the stiffening correction. Active damping part 56 has a differentiator which differentiates stain signal S to yield strain rate DS/dt (S') and a linear element which multiplies S' by a negative constant −D to generate the active damping correction. Finally, inertia reduction part 58 has two differentiators and a linear element to differentiate strain signal S twice and multiply the resulting strain acceleration signal $D^2 S/dt^2$ (S") by a positive constant I. The linear elements and differentiators are well-known in the art and the way in which they have to be used to generate each of the three correction terms is apparent to a person of average skill in the art.

The correction terms are combined to yield adjustment signal 60, which is sent to adder 62. In adder 62 adjustment signal 60 is combined with position signal 38 to produce feedback signal 50 and the latter is sent to current source 64. An optional amplifier 68 for amplifying feedback signal 50 is connected before current source 64.

Figure 7:
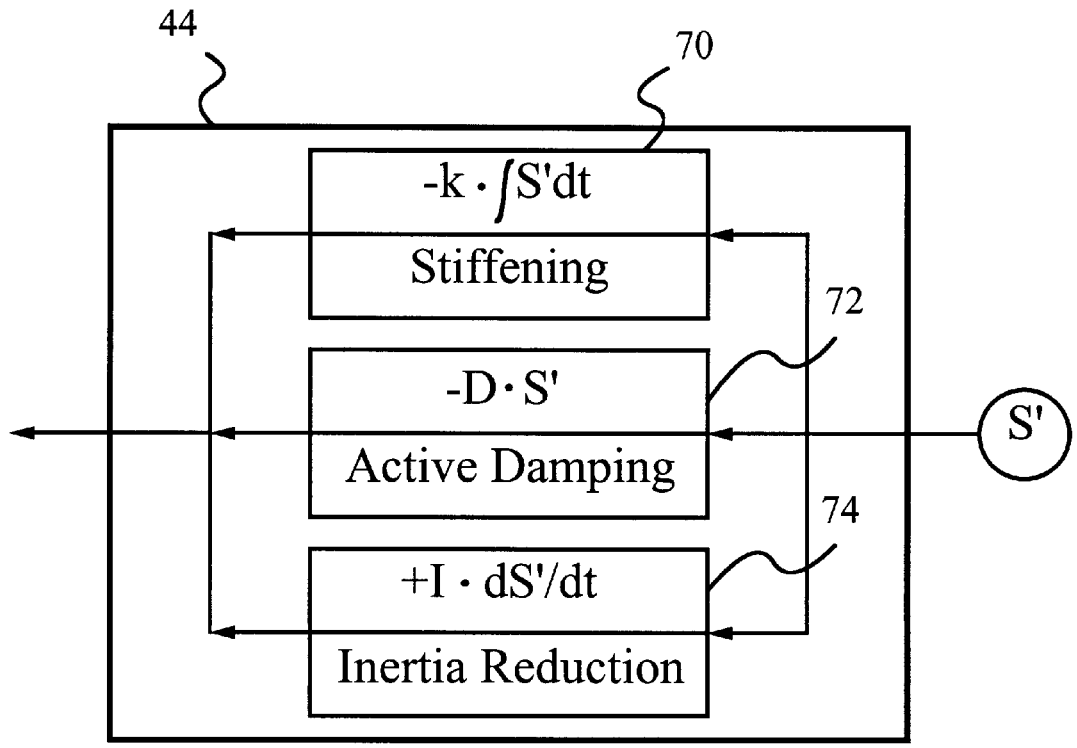
FIG. 7 is a block diagram showing the computation of the adjustment signal when using a strain rate sensor.
Figure 8:
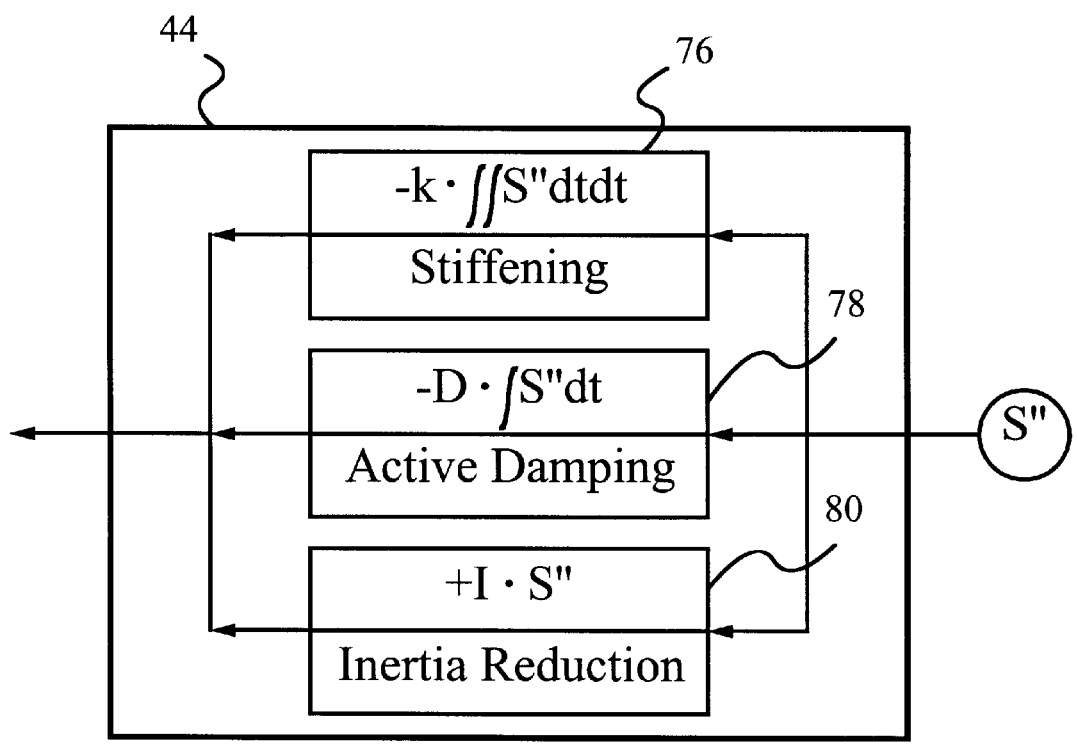
FIG. 8 is a block diagram showing the computation of the adjustment signal when using a strain acceleration sensor.

Sensors 66 can be replaced by strain rate or strain acceleration sensors. In fact, the use of sensors registering strain rate S' is preferred because they reduce the computational or hardware requirements on actuator control 44. This is shown in FIG. 7, where signal 52 is a strain rate signal S'. Now, a stiffening part 70 is an integrator which integrates strain rate S' and a linear element which multiplies it by negative constant −k. An active damping part 72 is replaced by a linear element with multiplier equal to −D. An inertia reduction part 74 is one differentiator and multiplier with its constant equal to I. The case in which signal 52 represents strain acceleration S" is shown in FIG. 8. Here a stiffening part 76, an active damping part 78 and an inertia reduction part 80 perform double integration and multiplication, integration and multiplication and multiplication respectively.

The result of applying the method of invention in an IBM Sailfin type actuator is illustrated in the graphs of FIGS. 9–13. The sensor in this example was positioned on the right side of the second to bottom arm (9th arm in an assembly of 10) of the actuator.

In FIG. 9 graph 100 illustrates the transfer function of the ninth arm when no active compensation is applied. Gain peaks are observed for all major modes including: a 1st butterfly mode 102, an S mode 104, a first end arm mode 106, a second end arm mode 108 and a second butterfly mode 110. Graph 112 shows the transfer function when actuator control 44 is turned on to provide active damping/stiffening. Clear benefits are experienced by all major modes 102, 104, 106, 108 and 110 with a drop of over 30 dB for mode 102.

Figure 10:
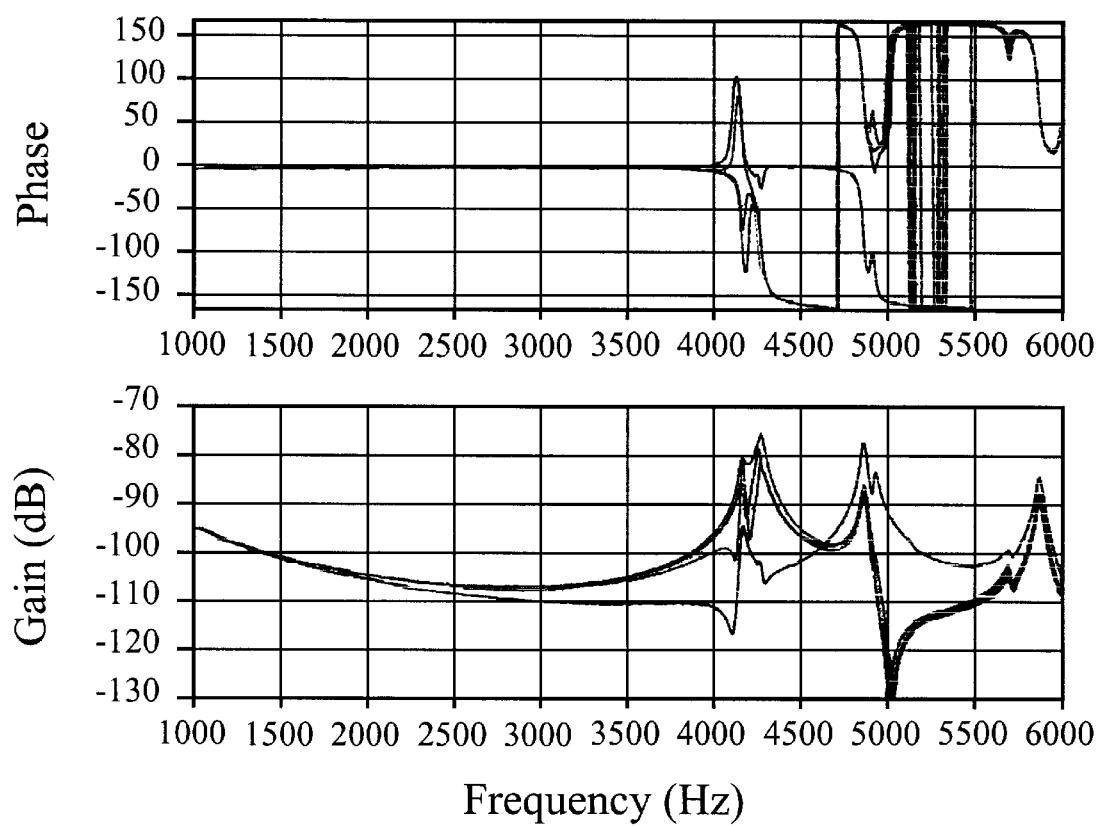
FIG. 10 is a graph of the transfer functions of the IBM Sailfin actuator when active compensation consists of active stiffening.
Figure 11:
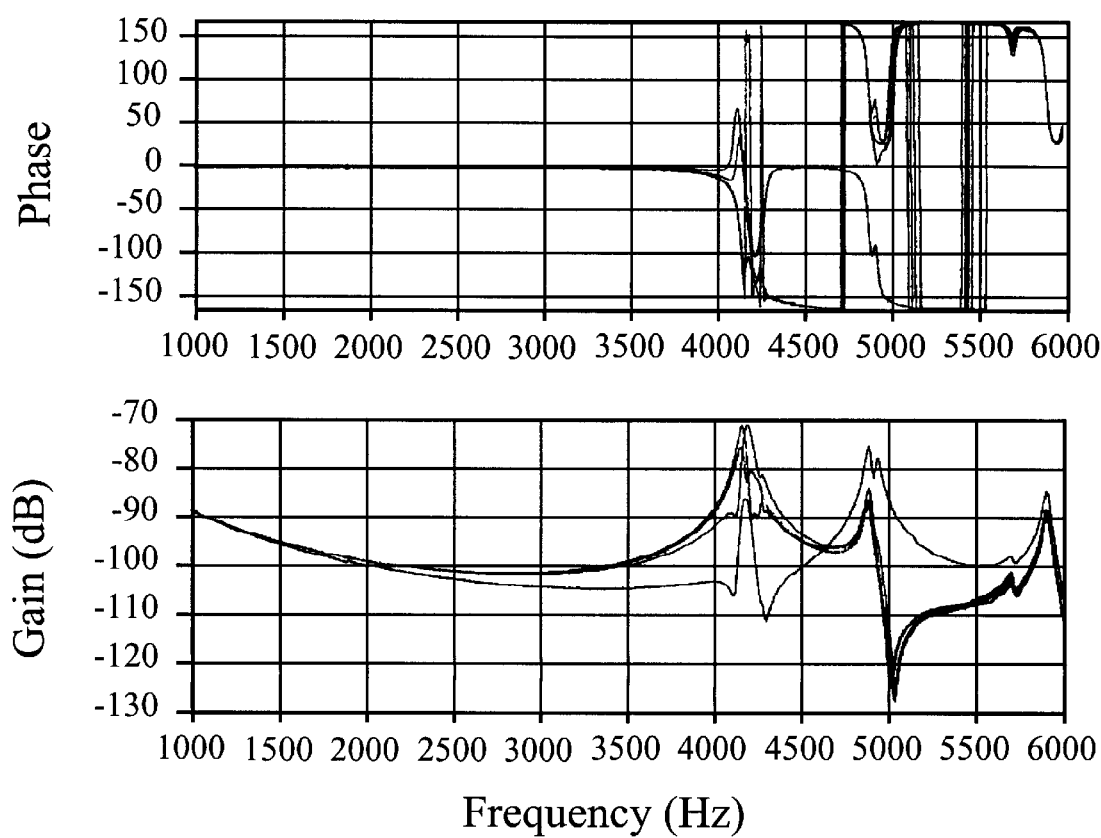
FIG. 11 is a graph of the transfer functions of the IBM Sailfin actuator when active compensation consists of active mass reduction.

The graphs in FIG. 10 show the transfer function of the Sailfin actuator for all arms when actuator control 44 applies the stiffening correction. The graphs in FIG. 11 show the transfer function for the Sailfin when the inertia reduction correction is applied.

Figure 12:
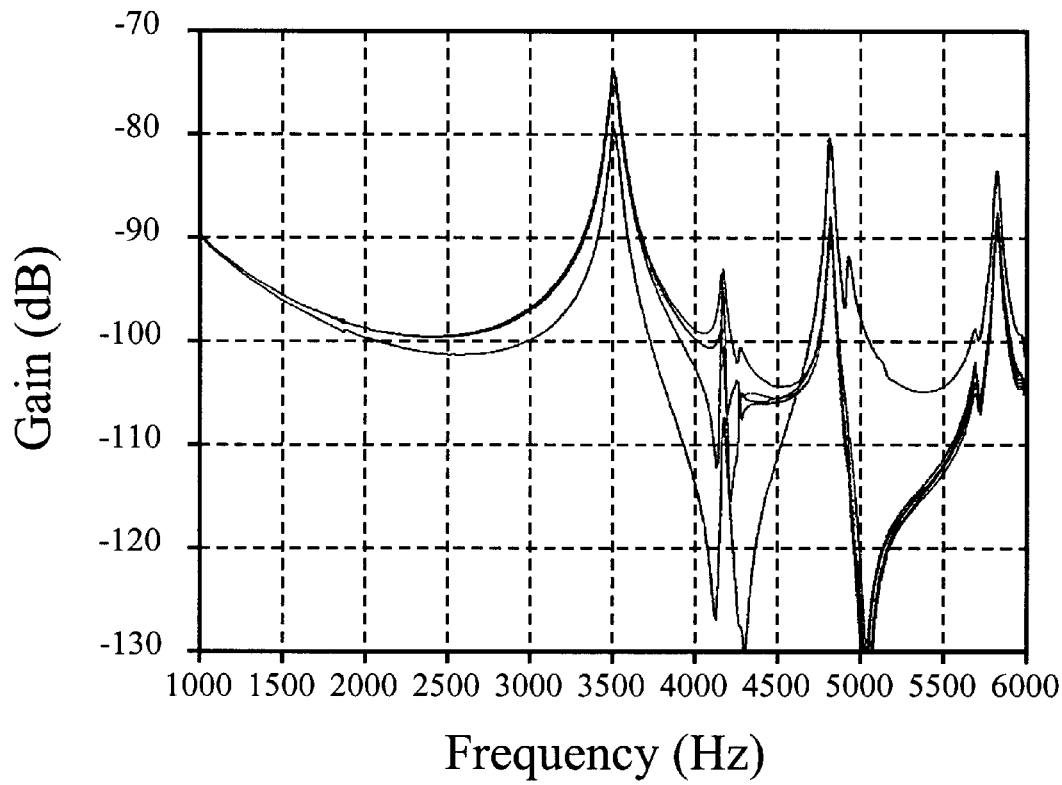
FIG. 12 is a graph of the transfer function for of the IBM Sailfin actuator without any damping compensation.
Figure 13:
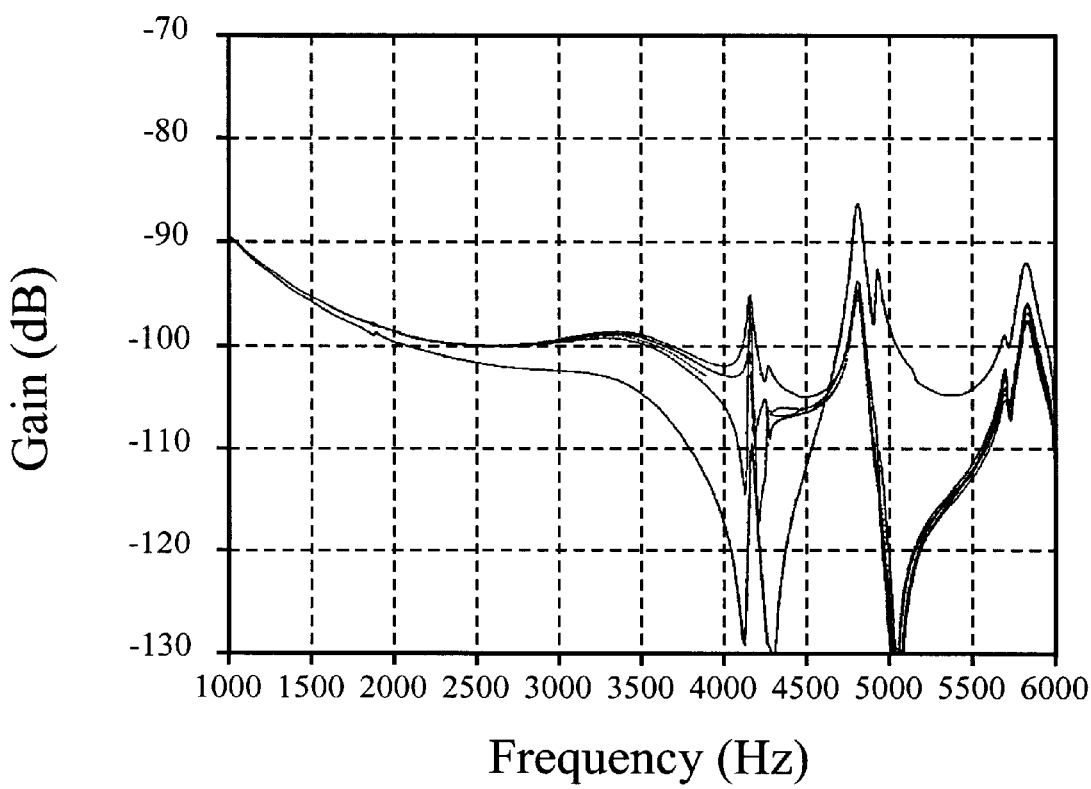
FIG. 13 is a graph of the transfer function of the IBM Sailfin actuator with an intermediate level of damping compensation.

The general effects of active compensation on the entire Sailfin actuator using all correction terms are shown by the transfer function graphs in FIGS. 12–14. In FIG. 12 no active compensation is used. In FIG. 13, with actuator control 44 turned on, the transfer function exhibits a gain drop of about 25 dB for the "butterfly" mode, 2 dB for the S mode and 6 dB for the end-arm mode.

These results for the three major modes are achieved without the use of gain filtering and incurring the associated disadvantages. Furthermore, no a priori knowledge of the system's vibrational modes was required and the transfer function H(s) did not have to be calculated. Since, the current method automatically detects only deformation without sensing the rigid body motion of arm assembly 12 it overcomes the disadvantage of the prior art of having to process the rigid body signal in the feedback loop and thereby affect the feedback performance.

System 10 thus enjoys stable operation and allows the designer of hard drives to increase the number of tracks per inch (TPI) significantly. Of course, operation stability also translates into improvements in the bandwidth and response characteristics of other actuator systems.

The above embodiments may be altered in many ways without departing from the scope of the invention. For example, rather than correlating the signals of sensors such that they are in phase with the major modes, the signals can be out of phase with all major modes. In such case the signal is simply multiplied by the factor −1 to obtain the proper in phase signal for processing in the feedback loop.

A person of average skill in the art will be able to make additional modifications based on the above teaching without venturing beyond the scope of the invention. Accordingly, its scope should be determined by the following claims and their legal equivalents.

What is claimed is:

1. An active control mechanism for stabilizing an actuator system having an arm assembly, a controlled element mounted on said arm assembly and generating a position signal indicating a displacement of said controlled element, an actuator for moving said controlled element by moving said arm assembly, said arm assembly experiencing vibrational modes, said active control mechanism comprising:
   a) a sensing means attached to said actuator for generating signals correlated to said vibrational modes;
   b) a control means connected to said sensing means for deriving from said signals an adjustment signal comprising:
      1) a stiffening correction;
      2) an active damping correction;
      3) an inertia reduction correction; and
   c) a combining element connected to said control means, to said controlled element and to said actuator for combining said adjustment signal and said position signal to produce a feedback signal for driving said actuator.

2. The active control mechanism of claim 1, wherein said control means generates said signals in phase with said vibrational modes.

3. The active control mechanism of claim 1, wherein said actuator comprises a coil and said sensing means detect sway deformations of said coil produced by said vibrational modes.

4. The active control mechanism of claim 3, wherein said sensing means comprise at least one strain rate sensor.

5. The active control mechanism of claim 4, wherein said control means comprise an integrator for generating said stiffening correction, a linear element for generating said active damping correction and a differentiator for generating said inertia reduction correction.

6. The active control mechanism of claim 3, wherein said arm assembly comprises a coil support and said coil is mounted in said coil support such that said sway deformations of said coil produce deformations of said coil support.

7. The active control mechanism of claim 6, wherein said sensing means are mounted on said coil support to register said deformations of said coil support.

8. The active control mechanism of claim 3, further comprising a current source connected to said combining element and to said actuator, said current source receiving said feedback signal and generating a proportional current for driving said actuator.

9. The active control mechanism of claim 1, wherein said sensing means are selected from the group consisting of strain sensors and strain acceleration sensors.

10. The active control mechanism of claim 1, wherein said actuator is a rotary actuator.

11. The active control mechanism of claim 1, further comprising a filter connected to said sensing means and to said control means for filtering out high-frequency components from said signals.

12. The active control mechanism of claim 1, further comprising an interrupt means connected to said control means for interrupting the operation of said control means when said arm assembly is accelerating.

13. The active control mechanism of claim 1, wherein said controlled element is a read/write head and said actuator is a hard drive actuator system.

14. A method for actively stabilizing an actuator system having an arm assembly, a controlled element mounted on said arm assembly and generating a position signal indicating a displacement of said controlled element, an actuator for moving said controlled element by moving said arm assembly, said arm assembly experiencing vibrational modes, said method comprising the following steps:
   a) generating signals correlated to said vibrational modes;
   b) deriving from said signals an adjustment signal comprising a stiffening correction, an active damping correction and an inertia reduction correction;
   c) combining said adjustment signal and said position signal to produce a feedback signal; and
   d) driving said actuator with said feedback signal.

15. The method of claim 14, wherein said vibrational modes comprise major modes.

16. The method of claim 14, wherein said generating step comprises generating said signals in phase with said vibrational modes.

17. The method of claim 14, wherein said generating step comprises generating said signals out of phase with said vibrational modes.

18. The method of claim 14, further comprising the step of interrupting said driving step when said arm assembly is accelerating.

19. The method of claim 14, further comprising the following steps:
   a) removably affixing said sensing means to said actuator at a test position;
   b) adjusting said test position until said signals are correlated with said vibrational modes at a final position; and
   c) permanently attaching said sensing means at said final position.

20. The method of claim 14, further comprising the following steps:
   a) analyzing said vibrational modes of said arm assembly;
   b) determining a final position at which said signals are correlated with said vibrational modes; and
   c) permanently attaching said sensing means at said final position.

21. The method of claim 14, wherein said signals are currents.

22. The method of claim 14, wherein said sensing means measure a strain S and said signals correspond to said strain S.

23. The method of claim 22, wherein deriving said stiffening correction comprises multiplying said signals by a constant, deriving said active damping correction comprises differentiating said signals and deriving said inertia reduction correction comprises twice differentiating said signals.

24. The method of claim 14, wherein said sensing means measure a strain rate S' and said signals correspond to said strain rate S'.

25. The method of claim 24, wherein deriving said stiffening correction comprises integrating said signals, deriving said active damping correction comprises multiplying said signals by a constant and deriving said inertia reduction correction comprises differentiating said signals.

26. The method of claim 14, wherein said sensing means measure a strain acceleration S" and said signals correspond to said strain acceleration S".

27. The method of claim 26, wherein deriving said stiffening correction comprises twice integrating said signals, deriving said active damping correction comprises integrating said signals and deriving said inertia reduction correction comprises multiplying said signals by a constant.

28. A data recording disk drive having a rotatable data disk having a plurality of data tracks, an actuator system having an arm assembly experiencing vibrational modes, a read-write head mounted on said arm assembly for reading data from or writing data to said data disk and for generating a position signal indicating a displacement of said read-write head relative to a desired data track on said data disk, and an active control mechanism for stabilizing said actuator system, said active control mechanism comprising:
   a) a sensing means attached to said actuator for generating signals correlated to said vibrational modes;
   b) a control means connected to said sensing means for deriving from said signals an adjustment signal comprising:
      1) a stiffening correction;
      2) an active damping correction;
      3) an inertia reduction correction; and
   c) a combining element connected to said control means, to said read-write head and to said actuator for combining said adjustment signal and said position signal to produce a feedback signal for driving said actuator.

29. The data recording disk drive of claim 28, wherein said control means generates said signals in phase with said vibrational modes.

30. The data recording disk drive of claim 28, wherein said actuator comprises a coil and said sensing means detect sway deformations of said coil produced by said vibrational modes.

31. The data recording disk drive of claim 30, wherein said sensing means comprise at least one strain rate sensor.

32. The data recording disk drive of claim 31, wherein said control means comprise an integrator for generating said stiffening correction, a linear element for generating said active damping correction and a differentiator for generating said inertia reduction correction.

33. The data recording disk drive of claim 30, wherein said arm assembly comprises a coil support and said coil is mounted in said coil support such that said sway deformations of said coil produce deformations of said coil support.

34. The data recording disk drive of claim 33, wherein said sensing means are mounted on said coil support to register said deformations of said coil support.

35. The data recording disk drive of claim 30, further comprising a current source connected to said combining element and to said actuator, said current source receiving said feedback signal and generating a proportional current for driving said actuator.

36. The data recording disk drive of claim 28, wherein said sensing means are selected from the group consisting of strain sensors and strain acceleration sensors.

37. The data recording disk drive of claim 28, wherein said actuator is a rotary actuator.

38. The data recording disk drive of claim 28, further comprising a filter connected to said sensing means and to said control means for filtering out high-frequency components from said signals.

39. The data recording disk drive of claim 28, further comprising an interrupt means connected to said control means for interrupting the operation of said control means when said arm assembly is accelerating.

40. The data recording disk drive of claim 28, wherein said controlled element is a read/write head and said actuator is a hard drive actuator system.

* * * * *